United States Patent Office 3,274,020
Patented Sept. 20, 1966

3,274,020
FILMS MADE FROM HIGHLY HYDROLYZED POLYVINYL ALCOHOL
Charles A. Heiberger, Princeton, and Daniel S. Dixler, Berkeley Heights, N.J., assignors, by mesne assignments, to Cumberland Chemical Corporation, New York, N.Y., a corporation of Delaware
No Drawing. Filed Feb. 15, 1962, Ser. No. 173,362
13 Claims. (Cl. 117—68)

This invention relates to thin transparent packaging films and, more particularly, to films having highly hydrolyzed polyvinyl alcohol as the base material.

There is a need for transparent packaging films of extremely low oxygen permeability for packaging of perishable foods such as ground meat, cheese, and the like. Presently available transparent packaging materials, even though characterized as having low oxygen permeability, do not keep highly perishable foods fresh except for a relatively short period of time.

We have found that packaging films having extremely low oxygen permeability can be made from polyvinyl alcohol having a hydrolysis of at least 99.6%. The oxygen permeability of polyvinyl alcohol film having a hydrolysis of at least 99.6% is markedly and unexpectedly lower than the oxygen permeability of films made from polyvinyl alcohol having a degree of hydrolysis of 99.5% or less. As the degree of hydrolysis is increased above 99.6%, the oxygen permeability drops rapidly. Films made from polyvinyl alcohol which is at least 99.7% hydrolyzed have very low oxygen permeability, far superior to anything previously known; these films constitute the preferred films of this invention.

Polyvinyl alcohol having a degree of hydrolysis of at least 99.6% is an excellent material for packaging films because, in addition to its low oxygen permeability, it has good tensile strength, elongation, tear strength, and bursting strength, and is capable of being shaped by conventional techniques using heat and vacuum. However, polyvinyl alcohol is susceptible to water vapor and its oxygen permeability is adversely affected by high humidity. For this reason it is highly desirable to coat polyvinyl alcohol with an adherent waterproof coating. The preferred packaging films of this invention therefore comprise a base sheet of polyvinyl alcohol having a degree of hydrolysis of at least 99.6%, and an adherent waterproof coating on at least one side thereof. The polyvinyl alcohol base sheet is preferably coated on both sides in order to assure maximum water resistance.

Various polymeric coating materials impart excellent water resistance to polyvinyl alcohol film. Examples of these polymeric materials include various copolymers such as vinylidene chloride-acrylonitrile, vinylidene chloride-vinyl chloride, and methyl methacrylate-ethyl acrylate; terpolymers such as methyl methacrylate-ethyl acrylate-acrylic acid; homopolymers such as polyethylene, polyvinyl chloride; and natural resins and derivatives such as nitrocellulose. Copolymers containing approximately 70 to 95% vinylidene chloride and conversely, 5 to 30% acrylonitrile, for example, have been found to be excellent coating materials. One such material is a copolymer of about 80% by weight of vinylidene chloride and about 20% by weight of acrylonitrile, which is commercially available under the trade name "Saran F-220" by the Dow Chemical Company, Midland, Michigan. Vinylidene chloride-vinyl chloride copolymers containing from about 50 to 75% vinylidene chloride, also provide excellent water resistance. A commercially available copolymer containing about 60% vinylidene chloride and 40% vinyl chloride, made and sold by the B. F. Goodrich Co., Akron, Ohio, under the trade name "Geon 222" is one material of this type which can be used for coating. Other suitable coating compositions will be apparent to those skilled in the art. Coated polyvinyl alcohol films according to this invention have very low oxygen permeabilities even in the presence of high humidity atmospheres and even in the presence of saturated atmospheres where condensation of water takes place.

Polymer coatings frequently do not adhere readily to the polyvinyl alcohol base sheet. Adherence can be improved either by applying an intermediate coating layer which adheres to both polyvinyl alcohol and the polymer coating, or by inclusion of a bonding agent in the polymeric coating material. For example, inclusion of a small amount of a polysiloxane (about 0.1 to 1%, based on the weight of copolymer) improves the adherence of vinylidene chloride-acrylonitrile copolymers to polyvinyl alcohol. The adherence of vinylidene chloride-vinyl chloride copolymers can be improved by means of a terpolymer of vinyl chloride, vinyl acetate, and a small amount of maleic anhydride, applied either as an intermediate layer or in admixture with the vinylidene chloride-vinyl chloride copolymer. There are also various means known in the art for improving the adherence of polymer coatings to base sheets of films, and these can be used to bond polymer coatings to polyvinyl alcohol.

The polymeric coating can be applied to the polyvinyl alcohol base sheet by methods known in the art, such as by applying a solution of the coating material in a suitable solvent with conventional coating apparatus.

The thickness of the polyvinyl alcohol base sheet according to this invention is not critical. Very low oxygen permeability is obtained with base sheets having a thickness of about 0.001 inch, i.e. from about 0.0008 to about 0.0012 inch, but the thickness may be considerably less or considerably greater if desired. The thickness can be as little as 0.0001 inch or as great as 0.01 inch. Although oxygen permeability is not greatly decreased as the thickness of the base sheet is increased above about 0.001 inch, thicker sheets are often advantageous for other reasons, such as increased strength.

This invention will now be described in detail with respect to specific embodiments thereof.

EXAMPLE 1

Two thin transparent films of 99.8% hydrolyzed polyvinyl alcohol, each 0.0008 inch thick, were oven-dried and coated on both sides with a vinylidene chloride-acrylonitrile copolymer. The first film was plasticized with 4 parts by weight of glycerol per 100 parts of polyvinyl alcohol, and the second film was plasticized with 10 parts by weight of glycerol plus 5 parts of 1,3-butanediol per 100 parts of polyvinyl alcohol. The copolymer was a commercial copolymer containing about 80% by weight of vinylidene chloride and about 20% by weight of acrylonitrile and having a specific viscosity of 200 centipoises as a 20% solution in methyl ethyl ketone, sold under the trade name "Saran F-220." This copolymer was applied as a 22% solution in methyl ethyl ketone. The solution also contained 0.2% by weight, based on the weight of copolymer, of poly(dimethylsiloxane), having a viscosity of 30,000 centipoises, sold under the trade name "Viscasil 30,000" by the General Electric Co., New York, New York, to form an adherent bond between the polyvinyl alcohol and the vinylidene chloride-acrylonitrile copolymer. The coatings were applied successively to each side, and the film was dried in an oven after each coating.

For comparison two additional films, made from 99.5% hydrolyzed polyvinyl alcohol and plasticized respectively with the same plasticizer systems as the two films described previously in this example, were coated with vinylidene chloride-acrylonitrile copolymer as described above.

The oxygen permeabilities of the four coated polyvinyl alcohol films of this example, in cc./100 in.²/day at 73° F. and 50% relative humidity, are shown in Table I below:

Table I

| Percent Hydrolysis | Plasticizer | Oxygen Permeability |
|---|---|---|
| 99.8 | 4% glycerol | Less than 0.01. |
| 99.8 | 10% glycerol + 5% 1,3-butanediol | Less than 0.01. |
| 99.5 | 4% glycerol | 0.10. |
| 99.5 | 10% glycerol + 5% 1,3-butanediol | 0.15. |

Oxygen permeability was measured by diffusion of oxygen through the film from an essentially pure oxygen atmosphere to an oxygen-free atmosphere, both at a total pressure of one atmosphere, at the indicated temperature and relative humidity. Water vapor permeability was measured by passage of water vapor through the film from a region of 100% relative humidity to a region of 50% relative humidity.

The coating layers were found to adhere satisfactorily to the base layer in adhesion tests. In one of these tests, a piece of adhesive cellophane tape was applied to the surface of the film and then pulled off quickly with no delamination. In the other test, two pieces of film were sealed together by the application of heat and pressure. After cooling, the two pieces were pulled apart. The seal was broken with only slight delamination in the vicinity of the seal and no delamination elsewhere.

EXAMPLE 2

A thin transparent film of 99.9% hydrolyzed polyvinyl alcohol, having a thickness of approximately 0.0008 inch and plasticized with 4 parts of glycerol per 100 parts of polyvinyl alcohol, was coated on both sides in sequence with a solution of a vinylidene chloride-vinyl chloride copolymer and a vinyl chloride-vinyl acetate-maleic anhydride terpolymer in methyl ethyl ketone. The total solids content of the solution was 20% by weight, and the weight ratio of copolymer to terpolymer was 15:1 (equivalent to a solids content of 94% copolymer and 6% terpolymer). The copolymer contained about 60% vinylidene chloride and 40% vinyl chloride, sold under the trade name "Geon 222." The terpolymer contained about 86% vinyl chloride, 11% vinyl acetate, and 3% maleic anhydride, sold under the trade name "Geon 443." The film was oven-dried at 180° F. for 2 minutes after each side was coated.

The oxygen permeability of the coated film was 0.03 cc./100 in.²/day at 72° F. and 50% relative humidity, and 0.08 cc./100 in.²/day at 72° F. and 90% relative humidity. The water vapor permeability was 0.7 gm./100 in.²/day at 72° F.

Adherence of the coating layers to the base layer was found to be satisfactory in both the cellophane tape and heat seal tests. Heat seal strength was also satisfactory.

EXAMPLE 3

A thin transparent film of 99.9% hydrolyzed polyvinyl alcohol, plasticized with 4 parts by weight of glycerol per 100 parts of polyvinyl alcohol, having a thickness of approximately 0.0008 inch, was coated on both sides in sequence with a 1% solution of a terpolymer of about 86% vinyl chloride, 11% vinyl acetate, and 3% maleic anhydride in methyl ethyl ketone. The terpolymer was a commercially available material sold under the trade name "Geon 443" by the B. F. Goodrich Co., Akron, Ohio. The film was dried at 180° F. for about 2 minutes after each side was coated. A 15% solution of a copolymer of 60% vinylidene chloride and 40% vinyl chloride, sold under the trade name "Geon 222" by the B. F. Goodrich Co., Akron, Ohio, in methyl ethyl ketone was then applied as a topcoat to both sides in sequence. The film was dried at 180° F. for about 2 minutes after each coating. The total thickness of the coated film was about 0.0013 inch, which corresponds to a coating thickness of 0.00025 inch on each side.

The coated film had an oxygen permeability of less than 0.01 cc./100 in.²/day at 72° F. and 50% relative humidity, and an oxygen permeability of 0.07 cc./100 in.²/day at 72° F. and 90% relative humidity. Water vapor permeability, adherence of the coating layers to the base layer, and heat seal strength were all satisfactory.

We claim:

1. A thin transparent film characterized by an oxygen permeability of at most about 0.03 cc./100 in.²/day at 72° F. and 50% relative humidity, comprising a base sheet formed from polyvinyl alcohol having a degree of hydrolysis of at least 99.8%, said base sheet having a thickness of about 0.0001 to about 0.01 inch, and an adherent water-proof polymeric coating on at least one side thereof.

2. A thin transparent film characterized by an oxygen permeability of at most about 0.01 cc./100 in.²/day at 72° F. and 50% relative humidity comprising a base sheet formed from polyvinyl alcohol having a degree of hydrolysis of at least 99.8%, said base sheet having a thickness of about 0.0001 to about 0.01 inch, and an adherent water-proof polymeric coating on at least one side thereof.

3. A thin transparent film characterized by an oxygen permeability of at most about 0.01 cc./100 in.²/day at 72° F. and 50% relative humidity comprising a base sheet formed from polyvinyl alcohol having a degree of hydrolysis of at least 99.8%, said base sheet having a thickness of about 0.0008 to about 0.0012 inch, and an adherent water-proof polymeric coating on at least one side thereof.

4. A thin transparent film characterized by an oxygen permeability of at most about 0.03 cc./100 in.²/day at 72° F. and 50% relative humidity comprising a base sheet formed from polyvinyl alcohol having a degree of hydrolysis of at least 99.8%, said base sheet having a thickness of about 0.0001 to about 0.01 inch, and an adherent water-proof polymeric coating on both sides thereof.

5. A thin transparent film characterized by an oxygen permeability of at most about 0.01 cc./100 in.²/day at 72° F. and 50% relative humidity comprising a base sheet formed from polyvinyl alcohol having a degree of hydrolysis of at least 99.8%, said base sheet having a thickness of about 0.0008 to about 0.0012 inch, and an adherent water-proof polymeric coating on both sides thereof.

6. A thin transparent film characterized by an oxygen permeability of at most about 0.01 cc./100 in.²/day at 72° F. and 50% relative humidity comprising a base sheet formed from polyvinyl alcohol having a degree of hydrolysis of at least 99.9%, said base sheet having a thickness of about 0.0008 to about 0.0012 inch, and an adherent water-proof polymeric coating on at least one side thereof.

7. A thin transparent film characterized by an oxygen permeability of at most about 0.03 cc./100 in.²/day at 72° F. and 50% relative humidity comprising a base sheet formed from polyvinyl alcohol having a degree of hydrolysis of at least 99.8%, said base sheet having a thickness of about 0.0001 to about 0.01 inch, and an adherent water-proof polymeric coating on at least one side thereof, said coating being selected from the group consisting of a copolymer of about 70 to 95% vinylidene chloride and 30 to 5% acrylonitrile and a copolymer of 50 to 75% vinylidene chloride and 50 to 25% vinyl chloride.

8. A thin transparent film characterized by an oxygen permeability of at most about 0.01 cc./100 in.²/day at 72° F. and 50% relative humidity comprising a base sheet formed from polyvinyl alcohol having a degree of hydrolysis of at least 99.8%, said base sheet having a thickness of about 0.0001 to about 0.01 inch, and an adherent water-proof polymeric coating on at least one side thereof, said coating being selected from the group consisting of a copolymer of about 70 to 95% vinylidene chloride and 30 to 5% acrylonitrile and a copolymer of 50 to 75% vinylidene chloride and 50 to 25% vinyl chloride.

9. A thin transparent film characterized by an oxygen permeability of at most about 0.01 cc./100 in.$^2$/day at 72° F. and 50% relative humidity comprising a base sheet formed from polyvinyl alcohol having a degree of hydrolysis of at least 99.9%, said base sheet having a thickness of about 0.0008 to about 0.0012 inch, and an adherent water-proof polymeric coating on at least one side thereof, said coating being selected from the group consisting of a copolymer of about 70 to 95% vinylidene chloride and 30 to 5% acrylonitrile and a copolymer of 50 to 75% vinylidene chloride and 50 to 25% vinyl chloride.

10. A thin transparent film characterized by an oxygen permeability of at most about 0.01 cc./100 in.$^2$/day at 72° F. and 50% relative humidity comprising a base sheet formed from polyvinyl alcohol having a degree of hydrolysis of at least 99.9%, said base sheet having a thickness of 0.0001 to 0.01 inch, and an adherent water-proof polymeric coating on both sides thereof, said coating being selected from the group consisting of a copolymer of about 70 to 95% vinylidene chloride and 30 to 5% acrylonitrile and a copolymer of 50 to 75% vinylidene chloride and 50 to 25% vinyl chloride.

11. A thin transparent film characterized by an oxygen permeability of at most about 0.03 cc./100 in.$^2$/day at 72° F. and 50% relative humidity comprising a base sheet formed from polyvinyl alcohol having a degree of hydrolysis of at least 99.8%, said base sheet having a thickness of about 0.0001 to 0.01 inch, and an adherent water-proof polymeric coating on at least one side thereof, said polyvinyl alcohol being plasticized with at least one member of the group consisting of glycerol and 1,3-butanediol.

12. A thin transparent film characterized by an oxygen permeability of at most about 0.03 cc./100 in.$^2$/day at 72° F. and 50% relative humidity comprising a base sheet formed from polyvinyl alcohol having a degree of hydrolysis of at least 99.8%, said base sheet having a thickness of about 0.0001 to about 0.01 inch, and an adherent water-proof polymeric coating on at least one side thereof, said coating being selected from the group consisting of a copolymer of about 70 to 95% vinylidene chloride and 30 to 5% acrylonitrile and a copolymer of 50 to 75% vinylidene chloride and 50 to 25% vinyl chloride, said polyvinyl alcohol being plasticized with at least one member of the group consisting of glycerol and 1,3-butanediol.

13. A thin transparent film characterized by an oxygen permeability of at most about 0.01 cc./100 in.$^2$/day at 72° F. and 50% relative humidity comprising a base sheet formed from polyvinyl alcohol having a degree of hydrolysis of at least 99.8%, said base sheet having a thickness of about 0.0008 to about 0.0012 inch, and an adherent water-proof polymeric coating on at least one side thereof, said coating being selected from the group consisting of a copolymer of about 70 to 95% vinylidene chloride and 30 to 5% acrylonitrile and a copolymer of 50 to 75% vinylidene chloride and 50 to 25% vinyl chloride, said polyvinyl alcohol being plasticized with at least one member of the group consisting of glycerol and 1,3-butanediol.

References Cited by the Examiner

UNITED STATES PATENTS

| | | | |
|---|---|---|---|
| 2,748,027 | 5/1956 | Meier | 117—76 |
| 2,910,385 | 10/1959 | Berry et al. | 117—138.8 |
| 2,990,391 | 6/1961 | Grantham. | |
| 3,214,291 | 10/1965 | Dixler | 117—138.8 |

OTHER REFERENCES

Smith: "Vinyl Resins," 1958, Reinhold Publishing, N.Y., pp. 23–25.

WILLIAM D. MARTIN, *Primary Examiner.*

RICHARD D. NEVIUS, *Examiner.*

K. G. WHEELESS, H. W. MYLIUS,
*Assistant Examiners.*